COMPATIBLE TONE RINGER

Filed Nov. 24, 1967 2 Sheets-Sheet 1

INVENTORS J. J. GOLEMBESKI
R. C. LEVINE
BY
ATTORNEY

April 21, 1970 J. J. GOLEMBESKI ET AL 3,508,012

COMPATIBLE TONE RINGER

Filed Nov. 24, 1967 2 Sheets-Sheet 2

3,508,012
Patented Apr. 21, 1970

3,508,012

COMPATIBLE TONE RINGER

John J. Golembeski, North Plainfield, and Richard C. Levine, Plainfield, N.J., assignors to Bell Telephone Laboratories, Incorporated, Murray Hill, N.J., a corporation of New York Filed Nov. 24, 1967, Ser. No. 685,489
Int. Cl. H04m 3/02, 5/12
U.S. Cl. 179—84 8 Claims

ABSTRACT OF THE DISCLOSURE

In a compatible tone ringer for a telephone set either conventional high voltage, low frequency ringing signals or low voltage, high frequency tone signals are applied to a transducer by way of a phase shift transistor oscillator. The oscillator is triggered by the high voltage input and the circuit elements in the feedback path of the oscillator operate as a bandpass filter for the tone signal inputs.

BACKGROUND OF THE INVENTION

Field of the invention

This invention relates to tone ringers and more particularly to the type of tone ringer that may be used in a telephone system.

Description of the prior art

The use of the conventional electromechanical bell ringer as the primary signaling device for telephone subscribers is virtually as old as the telephone itself. Despite the fact that bell ringers are effective, relatively simple to manufacture and seemingly modest in price when the overall cost of a telephone set is considered, recent advances in the telephone art and in the field of electronics in general, have made available a wide range of circuit components, techniques and tone generating transducers that in effect raise questions as to whether conventional telephone ringing systems may not be outmoded with respect to the very features which have been considered as highly advantageous.

For example, it is well known that an effective alerting signal may be sounded by a tone producing transducer, termed a "tone ringer," which signal is generally considered to be substantially more pleasing to the average ear than the characteristic jangle of a telephone bell. Adapting a tone ringer to the needs of telephone signaling does not appear to be a particularly complex problem until the question of actual "cut-over" or system conversion is considered. First, it is obvious that the cost of replacing all currently installed bell ringers with tone ringers would be prohibitive if only because of the cost of the service calls alone. Secondly, if tone ringers were installed in telephone sets only at the time of manufacture, it would appear necessary to provide a suitable transducer-actuating signal on a selective basis, preferably without introducing any additional complexity or excessive cost. Thirdly, even if the last indicated difficulty were overcome, there is a clear disadvantage in any system that requires different kinds of ringing signals for different kinds of phones.

SUMMARY OF THE INVENTION

The problems indicated above are met in accordance with the principles of the invention by utilizing a tone producing transducer actuated by a driving circuit which in turn is operatively responsive either to conventional bell ringing current or to tone signals. In one embodiment of the invention the transducer driving circuit is a transistor phase shift oscillator uitlizing an R-C phase shift network in the transistor feedback path. In effect, if a circuit in accordance with the invention is employed, the central office need not "know" whether a particular set is equipped with a tone ringer. If a conventional ringing signal is applied, the high voltage can be made to trigger the oscillator into action and the oscillator output drives the tone producing transducer. If, on the other hand, a tone isgnal of some suitable frequency or combination of frequencies in the audible range is applied from the central office, the circuit does not oscillate. The poles of the network function lie just inside the left half of the complex frequency plane, and the circuit then operates as a selective bandpass filter. The filter output may then be used to produce an output from the transducer. In either event, the audio tones produced can be made virtually indistinguishable.

An additional feature of a ringing circuit in accordance with the invention is that it may alternatively be operated to produce a steady ringing signal or tone as opposed to a conventional interrupted signal. A steady signal, which may be desirable for use in any emergency signaling situation such as a public service warning for example, may be produced simply by applying a direct current voltage across the line at the central office, provided that the voltage exceeds the threshold voltage of the ringer plus the direct current circuit losses.

DESCRIPTION OF THE PREFERRED EMBODIMENTS

Figure 1A:
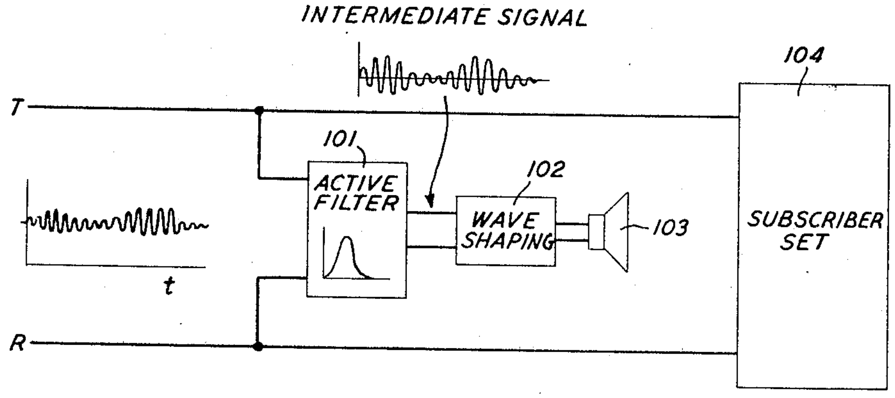
FIG. 1A is a block diagram of a tone ringer circuit with a tone signal input.

In accordance with an aspect of the invention, the arrangement shown in block form in FIG. 1A offers one means of operating a tone sounder or ringer for a telephone set. Connected across the telephone line TR is an active filter circuit 101, the output of which is applied to a waveshaping network 102. The output of the network 102 is in turn applied to a transducer or tone ringer 103. The remaining elements 104 of the telephone set, which are conventional, are connected across the line in the usual fashion.

The electrical input signal 105 illustrated in FIG. 1A may be a single frequency burst or a combination of tone bursts in the audio range. The employment of two or more simultaneous tones as opposed to a single tone is desirable in that a tone combination helps to ensure immunity from noise, crosstalk or any other spurious signals that may be on the line. Additionally, certain multitone input signals are generally considered to result in a more pleasing sound from the transducer than that produced by a single tone.

In accordance with the invention, the level of a tone ringing input signal is restricted to a relatively small magnitude (e.g., 3 volts, as opposed to 88 volts for conventional ringing) so that the line voltage does not rise appreciably above its nominal value. The active filter circuit 101 thus remains stable and performs essentially as a high Q network which filters, detects and amplifies the tone signal. The waveshaping network 102 performs whatever further signal translation that may be required to ensure that the signal finally applied to the transducer has suitable characteristics to enable efficient tone generation of the desired audible signal.

Figure 1B:
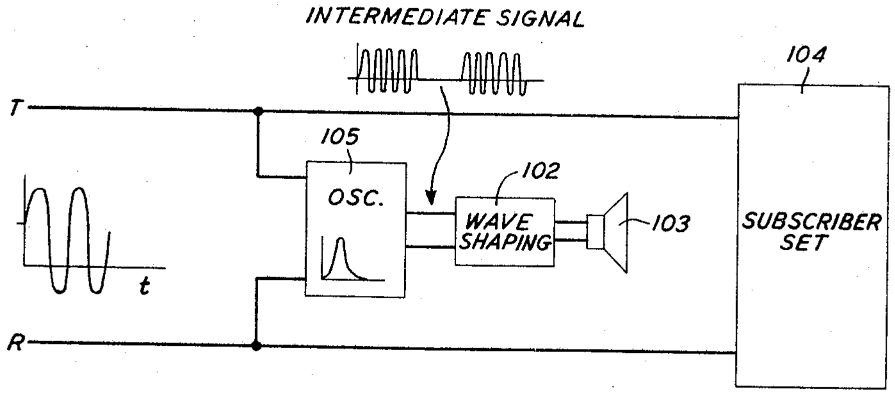
FIG. 1B is a block diagram of a tone ringer circuit with a conventional ringing signal input.

As demonstrated by the arrangement shown in block form in FIG. 1B, a conventional ringing signal, which is typically a relatively low frequency signal of approximately 20 Hz., may also be used in accordance with the invention to operate a tone producing transducer. The arrangement of FIG. 1B is substantially the same as that shown in FIG. 1A with the exception that an oscillator 105 has been substituted for the active filter 101. The input signal 106 has a relatively high voltage and a relatively low frequency, on the order of 80 volts and 20 Hz. for example. The high voltage of the input signal triggers the oscillator 105 into operation and the oscillator output is tailored to be substantially the same as the output of the active filter 101 shown in FIG. 1A. Also as in FIG. 1A, the processed signal is applied to the transducer 103.

In accordance with the invention, the active filter 101 of FIG. 1A and the oscillator 105 of FIG. 1B may be combined into a single dual-purpose circuit so that whether the input is a tone signal such as the signal 105 of FIG. 1A or a conventional high voltage low frequency ringing signal 106 as shown in FIG. 1B, the output from transducer 103 will be substantially the same. Such a combination filter-oscillator may be viewed as an active filter. The advantages of such an arrangement become more evident if the use of a specific circuit form, such as an active filter (or filter-oscillator) is discussed in terms of the utilization of input signals with specific frequencies. For example, if the dual-purpose circuit suggested were self-oscillatory at 460 Hz., it could be readily designed to produce an output in response to an input such as the signal 106 of FIG. 1B. This output would be substantially of the same spectral form as a 440–480 Hz. tone pair input. Further, if such a dual-purpose circuit were connected through a polarity-protecting diode bridge (which is a typical precaution for any electronic circuitry being considered for subscriber set use), two envelope pulsations of the 480 Hz. oscillation would occur during each half cycle of the 20 Hz. cycle. The resulting 460 Hz. carrier, modulated by 40 Hz., would then have the same baseband spectrum as the 440–480 Hz. combination, although its harmonics would be stronger in that the modulation envelope would not be purely sinusoidal.

In accordance with the invention, any one of a number of circuits may be employed to perform the dual roll of a filter and an oscillator. One such circuit is the phase shift oscillator shown in FIG. 2. This circuit relies on a feedback amplifier (transistor Q1) which can be made to oscillate with sufficiently high loop gain. The circuit may be designed so that a specific amplifier voltage gain, such as 29 for example, is required to initiate oscillation. A particular circuit may be designed so that the usual, smaller values of gain produce poles near the $j\omega$ axis in the left half of the complex frequency plane. Relatively large values of emitter resistance, combined with the particular value of collector resistance, produces a very stable gain, almost completely independent of transistor parameters. Consequently, with suitable values of resistance and capacitance in the feedback path, the circuit may be designed to exhibit a bandpass response centered upon a preselected frequency such as 460 Hz., for example.

Figure 2:
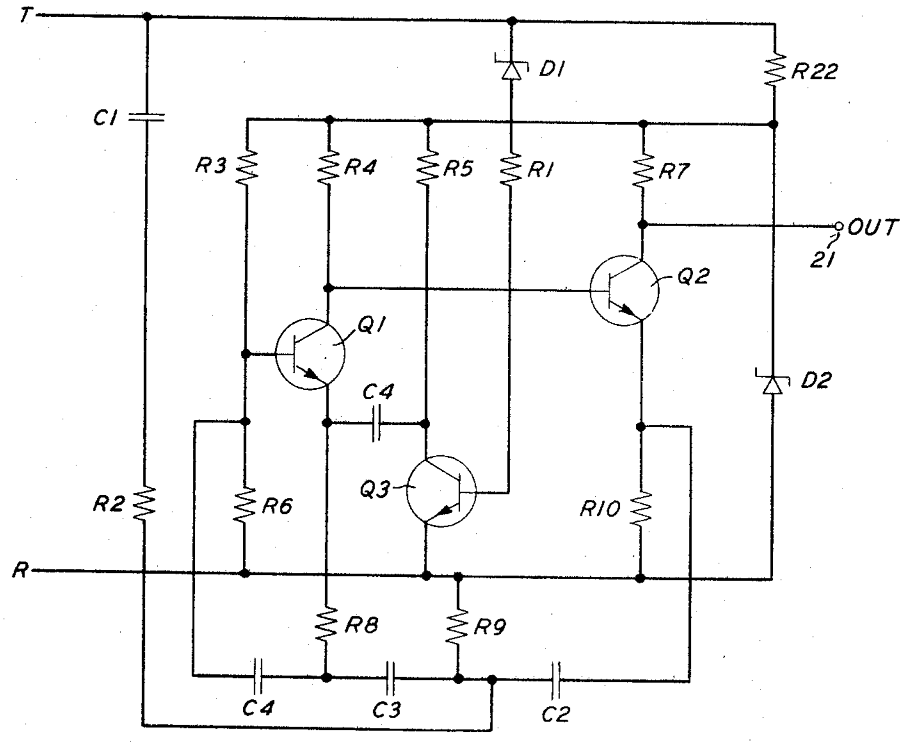
FIG. 2 is a schematic circuit diagram of a compatible tone ringer circuit in accordance with the invention.

In FIG. 2, as indicated above, transistor Q1 is the basic active element of a phase shift oscillator circuit. Transistor Q3 serves as a switch in the feedback path of the oscillator, the switch being turned on only when the input signal exceeds a preselected threshold established by Zener diode D1. Transistor Q2 has a gain of approximately unity and its collector is conected directly to the output point 21. The primary function of transistor Q2 is to provide a means for extracting the output signal from the circuit without coupling directly to the feedback loop. Additionally, transistor Q2 provides a low impedance drive to the feedback network.

The feedback network, which controls the bandpass filter characteristic and detects the input tones when the circuit does not oscillate, includes capacitors C2, C3 and C4 and resistors R8 and R9. An input path for tone signals is provided by a capacitor C1 and a resistor R2. Resistors R3, R4, R5, R6, R7 and R10 are primarily for the purpose of establishing transistor biasing levels. Capacitor C4 is a coupling capacitor between transistors Q1 and Q3; Zener diode D2 and resistor R22 control the level of input power to the circuit.

Operation of the circuit may be described briefly as follows: When an input signal having a voltage level which exceeds the threshold of Zener diode D1 is applied across the input terminals TR, the resulting signal applied by way of resistor R1 to the base of transistor Q3 turns on transistor Q3. This action produces an effective resistance in the emitter of transistor Q1 which is less than the resistance of resistor R8 by an amount dependent on the saturation resistance of transistor Q3. Hence, the gain of transistor Q1 increases from a value approximately equal to the ratio of R4/R8 to a larger value, one which causes oscillations to take place in the circuit.

The 180 degree phase shift required for oscillator operation is provided entirely by transistor Q1 since transistor Q2 is used as an emitter follower and is characterized by a zero degree phase shift when the feedback network is connected to its emitter. Resistor R10 not only establishes the proper biasing level on the emitter of transistor Q2 but also contributes to the establishment of the proper phase shift in the oscillator circuit.

The gain of the circuit can be increased greatly by simply decreasing the impedance in the emitter lead of transistor Q1. In accordance with the invention, transistor Q3 is introduced, in part, to serve this purpose in that when the line voltage increases sufficiently, as occurs during the high voltage ringing cycle, transistor Q3 is driven into action. This action reduces its collector impedance to the value of its saturation resistance and consequently reduces the emitter lead impedance of transistor Q1. The loop gain then increases markedly and the circuit oscillates so long as the line voltage remains above the threshold.

With the circuit shown, the positive half cycle of a 20 Hz. ringing signal, when employed as an input, will cause a tone burst output of 500 Hz. which is pulsed at a 20 Hz. rate. The incorporation of this network in a diode bridge circuit causes oscillations to take place at a 40 Hz. rate. The subjective effect is such that the sound is unmistakably identifiable as a telephone ring and closely approximates the audible results achieved with a 440–480 Hz. tone input combination.

Figure 3:
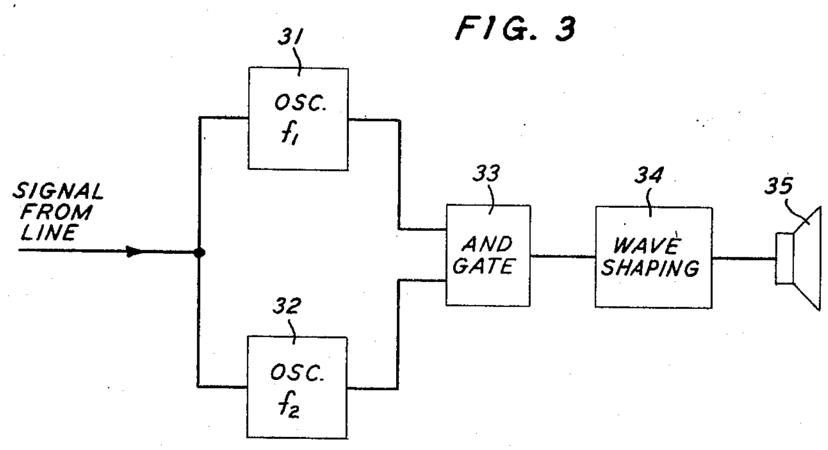
FIG. 3 is a block diagram of a compatible tone ringer circuit with improved immunity to false signals, in accordance with the invention, arranged either for a multitone input/output, or for a conventional high voltage ringing signal input and a multitone output.

Although a single oscillator-filter combination of the type shown in FIG. 2 provides a suitable compatible tone ringer, the combination of multiple phase shift oscillators and logic circuitry may be employed in accordance with the invention to enhance immunity to nonringing signals. Such an arrangement is illustrated in block form in FIG. 3. The phase shift oscillator 31 may, for example, be tuned to a frequency of 440 Hz., and a second phase shift oscillator 32 may for example be tuned to a frequency of 480 Hz. An AND gate 33 is then employed in accordance with the invention to ensure that an output is applied to the waveshaping network 34 and to the transducer 35 only in the presence of valid signals from both of the oscillators 31 and 32.

It is to be understood that the embodiment described herein is merely illustrative of the principles of the invention. Various modifications thereto may be effected by persons skilled in the art without departing from the spirit and scope of the invention.

What is claimed is:

1. In a telephone set a tone ringer operatively responsive to either relatively low frequency, high voltage input signals or to relatively high frequency, low voltage input signals comprising, a transistor oscillator circuit, said circuit including a filter in the feedback path thereof, means including a transducer connected to the output of said oscillator, said oscillator being triggered into operation by said low frequency, high voltage signals to produce an output having a frequency in the same range as said high frequency signals, and said filter operating as a bandpass for said high frequency input signals.

2. In a telephone set, a transducer for producing tone ringing signals, means for converting ringing input signals from a telephone line into signals to which said transducer is operatively responsive, said means comprising an oscillator circuit, threshold means responsive to ringing input signals exceeding a preselected magnitude for triggering said oscillator into operation, the output of said oscillator being then applied to operate said transducer, said oscillator including a filter network having bandpass characteristics, oscillatory ringing input signals conforming to said characteristics, even though less than said magnitude, being applied to operate said transducer, whereby said transducer is compatible with relatively low frequency, high voltage input signals and with relatively high frequency, low voltage input signals.

3. Apparatus in accordance with claim 2 wherein said threshold means comprises a transistor.

4. Apparatus in accordance with claim 2 wherein said oscillator circuit comprises a single transistor phase shift oscillator and wherein said filter network is an R-C network connected in the feedback path of said single transistor.

5. Apparatus in accordance with claim 4 including an additional transistor having its base-emitter path in the feedback loop of said oscillator, the output of said oscillator being applied to said transducer by way of the collector circuit of said last named transistor, said last named transistor thus providing a means for extracting an output from said oscillator without coupling directly to the feedback loop.

6. In a telephone set, a transducer for producing tone ringing signals, apparatus for converting ringing input signals from a telephone line into signals to which said transducer is operatively responsive, said apparatus comprising first and second filter networks each in circuit combination with a first and second oscillator, respectively, said oscillators being connected in parallel configuration, means including an AND gate circuit for applying the combined output of said oscillators to said transducer, thereby rendering said transducer operatively responsive to an input from said line comprising a relatively low frequency signal of sufficient magnitude to trigger both of said oscillators into operation or to an input from said line comprising two relatively high frequency signals each corresponding to the bandpass characteristics of a respective one of said filters.

7. Apparatus in accordance with claim 6 wherein each of said oscillators includes an amplifying transistor, a threshold transistor and an output coupling transistor, said amplifying transistor being the active element of said oscillator, said threshold transistor being operative to preclude the triggering of said oscillators by input signals below said sufficient magnitude, and said output coupling transistor providing a means for extracting an output from a respective one of said oscillators without coupling directly to the feedback loop thereof.

8. Apparatus in accordance with claim 6 wherein each of said filter networks comprises a respective R-C bandpass filter, each of said filters being in the feedback loop of a respective one of said oscillators.

References Cited

UNITED STATES PATENTS 2,951,909 9/1960 Bauman.

WILLIAM C. COOPER, Primary Examiner

W. A. HELVESTINE, Assistant Examiner